Aug. 16, 1960    C. G. COLEMAN, JR., ET AL    2,948,969
METHODS AND MEANS FOR SOLVING PROBLEMS BY PROGRESSIVE ANALYSIS
Filed March 23, 1955                                          4 Sheets-Sheet 1

INVENTORS
CHARLES G. COLEMAN JR.
HANK WEINER
BY
ATTORNEYS

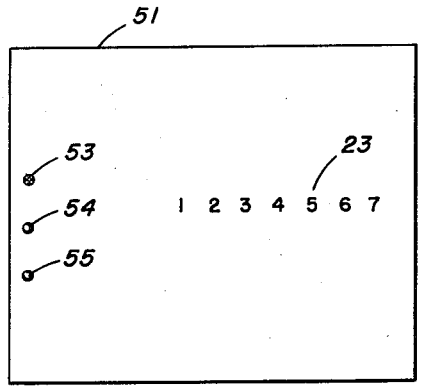

Aug. 16, 1960 C. G. COLEMAN, JR., ET AL 2,948,969
METHODS AND MEANS FOR SOLVING PROBLEMS BY PROGRESSIVE ANALYSIS
Filed March 23, 1955 4 Sheets-Sheet 3
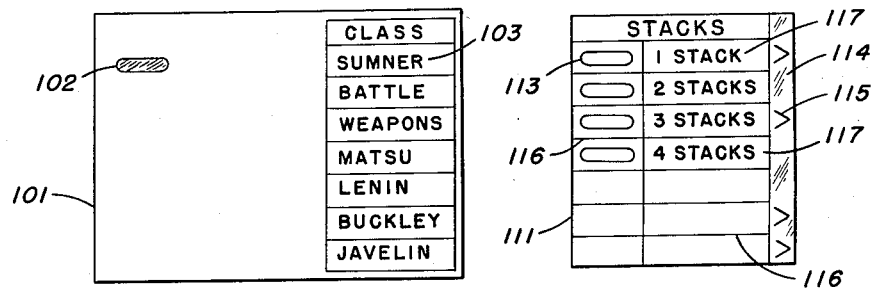
Fig. 10  Fig. 11
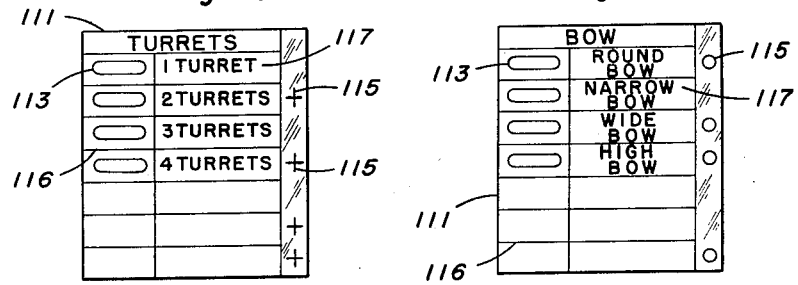
Fig. 12  Fig. 13
Fig. 15
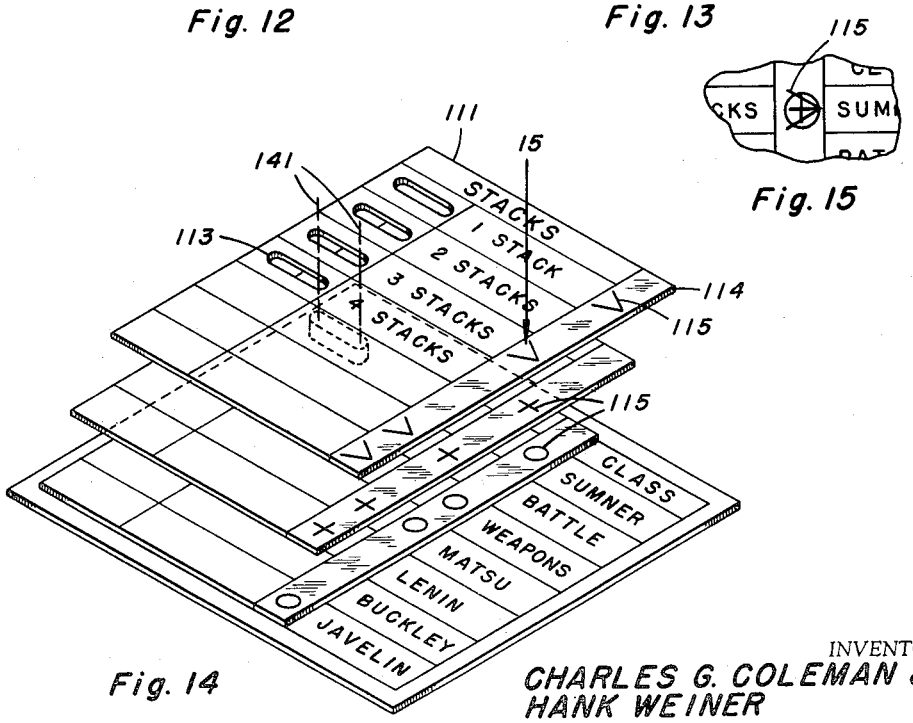
Fig. 14
INVENTORS
CHARLES G. COLEMAN JR.
HANK WEINER
BY
ATTORNEYS Aug. 16, 1960   C. G. COLEMAN, JR., ET AL   2,948,969
METHODS AND MEANS FOR SOLVING PROBLEMS BY PROGRESSIVE ANALYSIS
Filed March 23, 1955   4 Sheets-Sheet 4

INVENTORS
CHARLES G. COLEMAN JR.
HANK WEINER
BY
ATTORNEYS

United States Patent Office 2,948,969
Patented Aug. 16, 1960

2,948,969

METHODS AND MEANS FOR SOLVING PROBLEMS BY PROGRESSIVE ANALYSIS

Charles G. Coleman, Jr., 4718 Park Lane SE., and Hank Weiner, 1911 18th St. SE., both of Washington 20, D.C.

Filed Mar. 23, 1955, Ser. No. 496,357

3 Claims. (Cl. 35—9)

(Granted under Title 35, U.S. Code (1952), sec. 266)

The invention described herein may be manufactured and used by or for the Government of the United States of America for governmental purposes without the payment of any royalties thereon or therefor.

The present invention relates to methods and means for solving problems by progressive analysis and more particularly to methods and means for solving problems by progressive analysis utilizing a card key system.

Many problems, both concrete and abstract, can be solved in a step-by-step manner by a process termed herein as progressive analysis. This process is best explained through considering the solution of a concrete problem such as identification of a destroyer. Of the many methods for solving this problem, the process of progressive analysis is perhaps the most logical. Progressive analysis requires, initially, the knowledge of all solutions to the class of problems of interest, which for this example is the identity of all destroyers. The second step in this analysis involves resolving the problem destroyer into its individual features: number of turrets, length, shape of bow, etc. Then attention is focused on each feature, one at a time. The length could be noted first and this would eliminate from the solutions to the class of problems, all those solutions, i.e. specific destroyer classes, not having the length of this destroyer. Then another feature, such as the number of turrets, could be considered and thereby all destroyer classes of the noted length not possessing the observed number of turrets would be removed from the realm of possible solutions. Thus, as each feature is regarded, the number of possible solutions is diminished. This step-by-step process is continued until only one possible solution remains which possesses all of the features that have been considered, and this must be the true solution to the problem, which for this example is the class to which the observed destroyer belongs. Progressive analysis is, of course, not limited to the identification of a concrete object. Mathematicians as well as other theorists employ the same process to obtain the solutions to many abstract problems. In the past, the utilization of progressive analysis has required a highly skilled person thoroughly familiar with the class of subjects of interest and having a high intellect enabling him to perform many and perhaps all of the required steps in his mind. Accordingly, the accuracy of the solution has been primarily dependent upon the skill, intellect, and experience of the analyzer, which qualities of course vary with each individual.

The present invention pertains to methods and means for standardization of this step-by-step analysis. A base member is provided having one or more rows of indicia, such as numerals or letters situated thereon. Each indicium corresponds to one solution; consequently, there are at least as many indicia as there are possible solutions. Another portion of the invention includes cover cards which are adapted to be held in numerous fixed positions on the base. Each card is associated with a characteristic or feature and variations thereof which the solutions and problems may have. Feature indicating means are provided thereon that indicate only those indicia of the base corresponding to solutions having a specific variation of the feature associated with the card. The position of the card on the base member determines the specific variation. In operation, the cards, associated with features of the problem, are superimposed upon the base member until only one indicium remains which is indicated by all of the cards. This indicium corresponds to the true solution of the problem. Through the use of this card system, not only is accuracy increased but also relatively unskilled operators can solve problems heretofore requiring the labors of experts. These advantageous results are due to the standardization of operation and to the fact that the operator's attention is never focused, at one time, on the whole problem, i.e. all of the characteristics or features, but rather is limited to the few specific details of one feature.

Accordingly an object of the present invention is the provision of a method and means for solving problems by progressive analysis utilizing standardized concepts and materials.

Another object is to provide method and means for solving problems by progressive analysis capable of utilization by a relatively unskilled operator.

A further object of the present invention is the provision of a system for solving problems by eliminating in a step-by-step manner, according to predetermined relationships between features of the problem and possible solutions, all but one indicium from a group of indicia wherein the indicia have a known association with possible solutions.

Still another object is to provide an indexed base which in cooperation with indicator cards that are superimposed thereon can be utilized to perform a process of progressive analysis.

A still further object of the present invention is the provision of indicator cards which in cooperation with an indexed base can be utilized to perform a process of progressive analysis.

Other objects and many of the attendant advantages of this invention will be readily appreciated as the same becomes better understood by reference to the following detailed description when considered in connection with the accompanying drawings wherein:

Fig. 5 illustrates a plan view of a base member of another embodiment of the invention.

Fig. 6 is a plan view of a card suitable for use with the base of Fig. 5.

Fig. 7 shows a plan view of the card of Fig. 6 positioned on the base of Fig. 5.

Fig. 8 is an end view of Fig. 7.

Fig. 9 illustrates an interpretation card suitable for use with the embodiments of this invention.

Fig. 10 shows a plan of a base member of still another embodiment of the invention.

Fig. 11 is a plan view of a card suitable for use with the base of Fig. 10.

Fig. 12 illustrates a plan view of another card suitable for use with the base of Fig. 10.

Fig. 13 shows a plan view of still another card suitable for use with the base of Fig. 10.

Fig. 14 is a perspective view of the cards of Figs. 11, 12, and 13 superimposed upon the base of Fig. 10.

Fig. 15 illustrates a portion of the view of Fig. 14 looking in the direction of arrow 15.

Figure 1:
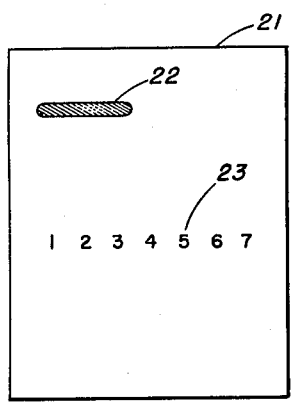
Fig. 1 shows a plan view of a base member of one illustrative embodiment of the invention.
Figure 2:
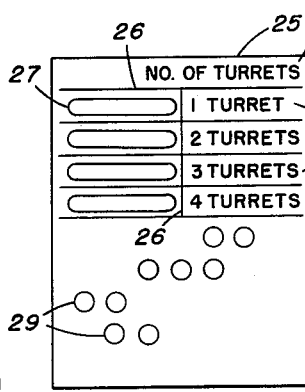
Fig. 2 illustrates a plan view of a card suitable for use with the base member of Fig. 1.
Figure 3:
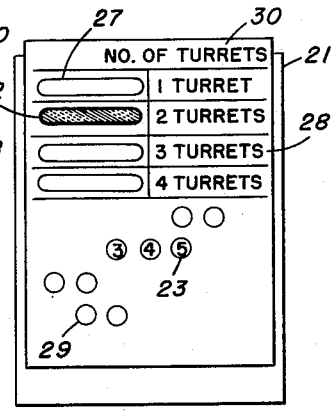
Fig. 3 is a plan view of the card of Fig. 2 positioned upon the base of Fig. 1.
Figure 4:
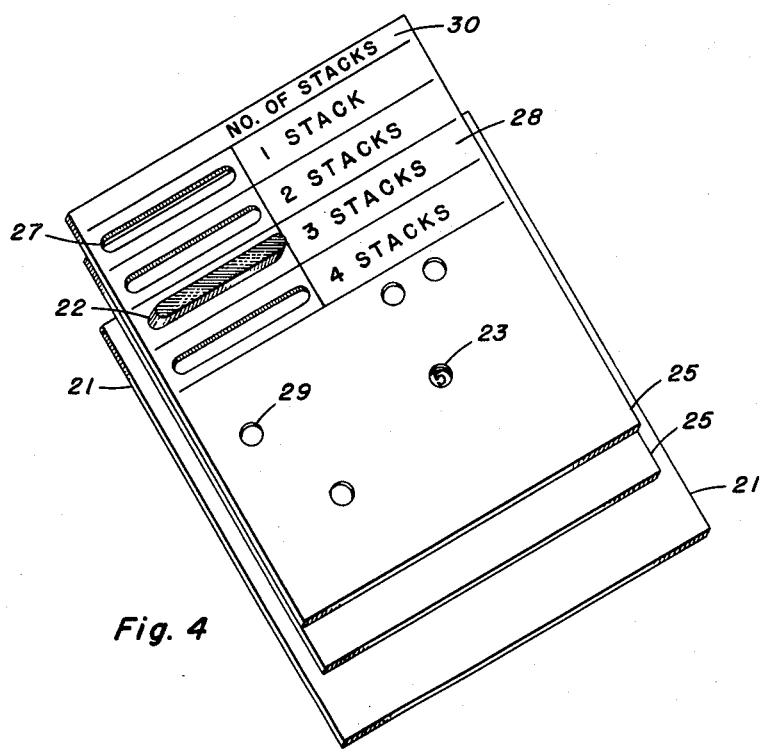
Fig. 4 shows a perspective view of several cards similar to that of Fig. 2 superimposed upon the base of Fig. 1.

Referring now to the drawings, wherein like reference characters designate like or corresponding parts throughout the several views, there is shown in Fig. 1 a base member comprising a rectangular-shaped body 21. Near one corner, a guide member 22 is provided while appropriate indicia 23 are situated near the center. The card of Fig. 2 comprises a rectangular-shaped sheet 25 whereon markings 26 subdivide a portion into two rows of parallel arranged rectangles. Elongated slots or apertures 27, which are slightly larger than the guide member 22 of Fig. 1, are located in one row of these rectangles and situated in the other row are the feature designations 28 for determining the use of the card. Rows of apertures 29, of any suitable shape, are provided beneath the rows of rectangles. The number and positions of the apertures 29 in the rows are a function of the designations 28 and the indicia 23 of Fig. 1. The title 30 is located, for convenience, near the top of sheet 25. In Fig. 3, the card of Fig. 2 is shown positioned on the base of Fig. 1. It is seen that the elongated slots 27 are just slightly larger than guide member 22 so that there is a closely fitting relationship. Only those indicia 23 that aline with apertures 29 can be observed by the operator. In Fig. 4, another card is shown superimposed upon the card and base of Fig. 3. Only those indicia 23 that aline with apertures 29 in both cards are visible.

In the base shown in Fig. 5, which is for another embodiment, a rectangular-shaped body 51 of flat-surfaced material is provided near the center with indicia 23. Situated along one edge is a guide member comprising a row of three rods 53, 54 and 55. One of these rods, 53, is provided with a distinctive feature, such as color, so that it is distinguishable from the other rods 54 and 55. The card of Fig. 6 comprises a rectangular-shaped sheet 61 having a row of circular (or other shaped) apertures 62 along one edge thereof. Markings 63 divide all but a small portion 64 of the card into 2 rows of rectangles. Portion 64 serves as a margin on which the title 65 is placed. Apertures 66, of any desired shape, are positioned in parallel rows in one of the rows of rectangles. The number and positions of apertures 66 are a function of the feature designations 67 in the adjacent rectangles. In Fig. 7, the card of Fig. 6 is shown placed on the base of Fig. 5. Only those indicia 23 that aline with apertures 66 are visible. Fig. 8 which is an end view of Fig. 7, clearly shows the shapes of rods 53, 54, and 55. It should be apparent that this shape is largely a matter of discretion with the limitation that apertures 62 and the cross-section of rods 53, 54, and 55 should be similar in shape so that a fairly tight fit can be had thereby eliminating the possibility of card wobble.

In Fig. 9, indicia 23, identical to that on the base members of Figs. 1 and 5, are provided along one edge of a rectangular card 91. Situated adjacent this column, are the solutions 90 to the class of problems which for this example are classes of destroyers.

The base member of Fig. 10 comprises flat-surfaced material 101 having a guide member 102 near one corner and a row of indicia 103 along one edge. For this embodiment, the indicia 103 are the solutions to the problems. The card of Fig. 11 has a sheet-like body 111 which is subdivided by markings 116 into two rows of parallel-arranged rectangles. Apertures 113, which are situated along one edge, are designed to have a close fit with guide member 102 of the base in Fig. 10. Another edge of this card is constructed from transparent material 114 and has feature indicia 115 thereon. The number and positions of the indicia are a function of the feature designations 117 and the indicia 103 of Fig. 10. The cards of Figs. 12 and 13 are similar to the card of Fig. 11, except they represent different features of the problems. Accordingly, the designations 117 and indicia 115 are distinctive for each card. In Fig. 14 the cards of Figs. 11, 12, and 13 are shown superimposed upon the base of Fig. 10. These cards are shown in a loose stack, i.e. not in contact, to render the indicia 115 visible for all of the cards; also, the lines which would be seen through the transparent edging 114 have been omitted for clarity. It is to be realized that in normal use the cards would be directly on top of one another. Projection lines 141, indicate that the cards are directly over one another and if stacked tightly, guide member 102 would project through the third aperture 113 of the top card. Fig. 15 shows a segmental plan view looking in the direction of arrow 15 of Fig. 14. The feature indicia 115 are superimposed producing a composite pattern.

Figure 17:
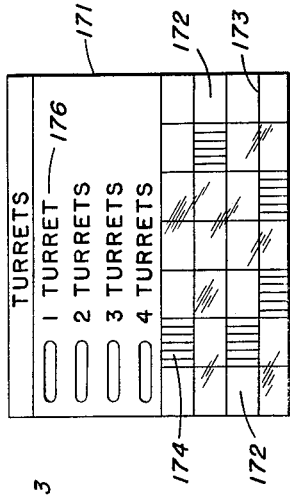
Fig. 17 is a plan view of a card suitable for use with the base of Fig. 16.
Figure 18:
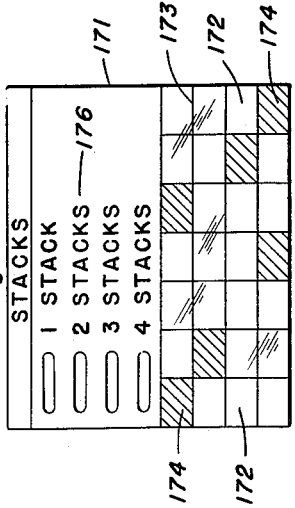
Fig. 18 is a plan view of another card suitable for use with the base of Fig. 16.
Figure 19:
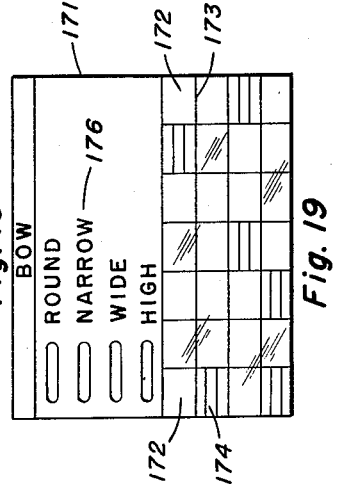
Fig. 19 is a plan view of still another card suitable for use with the base of Fig. 16.
Figure 16:
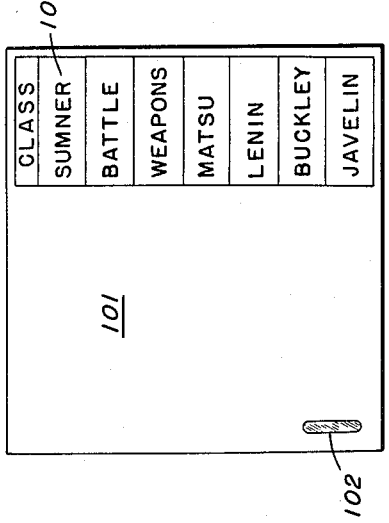
Fig. 16 shows a plan view of a base member of a further embodiment of the invention.
Figure 20:
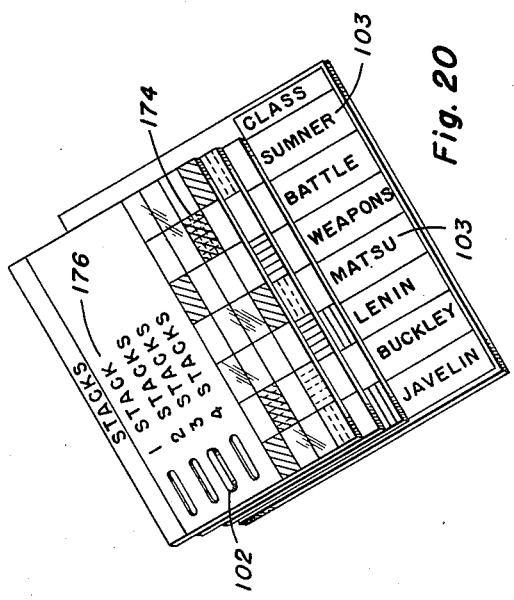
Fig. 20 is a perspective view of the cards of Figs. 17, 18, and 19 superimposed upon the base of Fig. 16.

The base of Fig. 16 is similar to that of Fig. 10, except that the guide member 102 is positioned in a different corner and is parallel to a different edge. The cards of Figs. 17, 18 and 19 have a sheet-like body portion 171; one portion 172, of which, is transparent. Markings 173 subdivide transparent portion 172 into rows of rectangles. Distinctive feature indicia 174 are provided for each card. The positions and numbers of these indicia 174 are a function of the feature designations 176 and the indicia 103 of Fig. 16. In Fig. 20, the cards of Figs. 17, 18, and 19 are shown superimposed upon the base of Fig. 16. Some of the indicia 174 are superimposed thereby producing composite patterns.

As previously stated, this invention can be used to solve any problem, concrete or abstract, for which all of the possible solutions are known and wherein the characteristics of the problem can be recognized and associated with like characteristics in the group of possible solutions. In order to simplify the disclosure, the solution of a concrete problem is illustrated for which there are only a few solutions. Specifically, the problem is the identification of an object which the operator can see directly or indirectly by means of a photograph. The object is a ship and it is postulated that the observor knows the object is a destroyer but he does not know the class to which it belongs. His problem is to find this class. For progressive analysis there must be at least as many indicia 23 on the base of Fig. 1 as there are different classes of destroyers. This number is here assumed to be seven or less. Each indicium 23 is associated with a different class of destroyer and this association is laid out for convenience on an interpretation card such as that shown in Fig. 9. A card, similar to that of Fig. 2, is provided for each characteristic or feature possessed by destroyers; e.g. number of turrets, number of stacks, length, shape of bow, etc. In turn, each card has the characteristic or feature thereof further classified into the various different forms of that characteristic; e.g. different numbers of turrets or stacks, various lengths, various bow shapes, etc. The operator focuses his attention on one characteristic at a time. He may first look at and count the destroyer's turrets. If so, he than selects the turret card and positions it on the base such that guide member 22 appears through the elongated aperture 26 adjacent the designation 28 which agrees with the number of turrets on the observed destroyer. Assuming the destroyer has 2 turrets the card is then placed in the position shown in Fig. 3. Corresponding to each form of characteristic are one or more rows of apertures 29, the number being equal to the number of rows of indicia 23. Of course the card system has originally been constructed to correlate the number and positions of all the apertures with the feature designations 28 and indicia 23 for the classes of destroyers. This is done in such a manner that when a card is placed on the base as in Fig. 3 only those indicia card will align with the apertures 29 that correspond to classes of destroyers having two turrets; naturally, the same is also true for the other number of turrets. Thus it is seen there are three classes of destroyers, those corresponding with indicia 3, 4, and 5, that have two turrets. By placing this card on the base, the number of possible classes has been decreased from seven to three. In Fig. 4, another card is shown superimposed upon the turret card of Fig. 3. The operator has noted that the destroyer has three stacks and has positioned the stack card accordingly. Only one indicium is visible through the apertures of both cards, i.e. there is only one class of destroyers having two turrets and 3 stacks. This class can be identified by noting which class on the indicia relationship card of Fig. 9 is adjacent the remaining indicium 5, which, for this example, is the Lenin class. As mentioned above, the problem has been simplified to facilitate the explanation, but it should be obvious that the card device would have been similarly operated had there been forty classes of destroyers instead of seven. Then there would have to be at least forty different indicia 23 on the base and for convenience, they might be arranged in more than one row. If more than one row of indicia 23 is employed, the rows of apertures 29 corresponding to each elongated aperture 27 must be increased accordingly. Likewise, there may be more than four forms of each characteristic and hence additional elongated apertures 27 and rows of apertures 29 would be required.

The embodiment shown in Figs. 5 through 8 inclusive, functions in a manner which is quite similar to that of the embodiment just discussed. The indicia 23 on the base of Fig. 5 are equal to or greater than the number of possible solutions. Cards similar to that shown in Fig. 6 are provided for each characteristic and in turn the characteristic is further subdivided into its various forms 67. The rows of apertures 66, in each rectangle, are equal to the number of rows of indicia 23. The card is positioned on the base such that the distinctive rod 53 is situated in the rectangle having the designation therein corresponding to the form of characteristic observed. From the showing of Fig. 7 it is apparent that the observed destroyer must have two turrets and that there are three destroyer classes having this number. In operation, other cards would be superimposed upon the base until only one indicium remained visible, and then through use of the interpretation card of Fig. 9, the solution would be noted.

In another embodiment (Figs. 10–15), the solutions 103 are listed along one edge of the base, shown in Fig. 10. When one of the cards of Figs. 11, 12, or 13 is placed thereon, the feature indicia 115 will be adjacent those solutions 103 having the feature corresponding to the designation 117 adjacent the guide member 102. The cards are superimposed upon the base, according to the features of the observed destroyer, until there is only one solution adjacent which there are feature indicia 115 for each card. In the stacked arrangement of Fig. 14, there is only one class, the Sumner, possessing the specific feature variation of each card. The resultant composite pattern is shown in Fig. 15. It is to be noted that not only total but also partial solutions can be observed from this embodiment; i.e. those solutions possessing some of the features but not all as well as the solution having all of the features is manifest. This may have some utility in special applications. Also, there is no need for an interpretation card since the solutions themselves are placed on the base.

In the embodiment of Figs. 16–20, the base, shown in Fig. 16, has the solutions 103 along one edge. The cards of Figs. 17, 18, and 19 are stacked thereon as is shown in Fig. 20. The feature indicia 174 aline in a row with the solutions possessing the specific feature variation of each card. The advantage of this embodiment over that of Figs. 10–15, is that a whole row of rectangles extending along one edge are available for each feature variation, i.e. if there are four features, as shown in the figures, then there are four rows of transparent rectangles. In the previous embodiment there was only one row for all of the feature variations, thus only a few variations could be used since otherwise the placement of the indicia for one feature variation might interfer with those of another. The embodiment of Figs. 16–20 also has the advantages of showing partial solutions and of eliminating the need of an interpretation card.

Means and methods have been disclosed for solving problems by progressive analysis. Several embodiments have been shown using different types of indicating and card securing means. There are many possible variations of this invention of which the present embodiments are only a few. All of these embodiments are standardized, incomplex, small, light, and inexpensive to construct and permit relatively untrained operators to solve problems which heretofore required the attention of experts.

Obviously many modifications and variations of the present invention are possible in the light of the above teachings. It is therefore to be understood that within the scope of the appended claims the invention may be practiced otherwise than as specifically described.

What is claimed is:

1. A progressive analyzer comprising the combination of a base member, indicator means on said base member, guide means for holding cards in a stationary position on said base member in a predetermined laminar relationship; and a plurality of cards having apertures therein, and plural means on each card for cooperation with said guide means whereby each card can be held in any one of a plurality of positions on said base member thereby alining different apertures with said indicator means.

2. A method of employing a base member and a plurality of cards to obtain the identification of a ship by progressive indicating analysis comprising the steps of: making a list of classes of ships which contains the ship to be identified; producing an indicia class relationship by associating distinctive indicium with each of said classes; laying out the indicia on the base member in one or more rows; resolving the ships of said classes into several recognizable characteristics; placing an identifying characteristic on each card; identifying at least one characteristic by its various features; providing a structural variation for each feature in those cards having various features; providing at least one structural variation in the base for mating relationship with each structural variation of the cards representing a feature; providing apertures in each card such that when the card is positioned on the base only those indicia aline with the apertures which are associated with a ship having the characteristic associated with the card; and progressively superimposing cards, having associated therewith characteristics identical to those of a given ship, upon the base until only one indicium remains alined with apertures in all of the superimposed cards; and comparing the remaining indicium with the indicia-class relation thereby obtaining the identification of said ship.

3. For use with a base having a guide means for holding a stack of cards and having indicia thereon corresponding to solutions for a class of problems, a plurality of cards each one correlated with a feature common to the solutions and problems and having a plurality of apertures therein and having a shape similar to that of the base, some of the apertures being arranged in a first row along one edge for cooperation with the base guide means whereby the card can be placed on the base in any one of several possible positions, the remainder of the apertures being arranged in a plurality of parallel arranged rows orthogonally positioned with respect to said first row; a plurality of identical markings, each marking representing said feature and located adjacent a respective aperture in said first row, designations representing variations of said feature, each designation located adjacent a respective aperture and in close proximity to a respective marking and encompassing at least one of the parallel rows; the number of and relative positioning of the apertures in each parallel row having a functional relationship with the encompassing designation, said relationship being such that when a first aperture adjacent a first designation representing a first feature variation cooperates with said guide means, the indicia on said base representing solutions which have the first feature variation are visible through the parallel row of apertures encompassed by the first designation and when a second aperture adjacent a second designation representing a second feature variation cooperates with said guide means the indicia on said base representing solutions which have the second feature variation are visible through the parallel row of apertures encompassed by the second designation.

References Cited in the file of this patent

UNITED STATES PATENTS

| | | |
|---|---|---|
| 1,165,465 | Taylor | Dec. 28, 1915 |
| 1,351,692 | Soper | Aug. 31, 1920 |
| 1,525,342 | Van Order | Feb. 3, 1925 |
| 1,526,717 | Nunez | Feb. 17, 1925 |
| 1,988,634 | Stonecypher | Jan. 22, 1935 |
| 2,080,150 | Peterson et al. | May 11, 1937 |
| 2,228,331 | Warner | Jan. 14, 1941 |
| 2,349,325 | Willard et al. | May 23, 1944 |
| 2,353,238 | Horr | July 11, 1944 |
| 2,385,452 | Lande | Sept. 25, 1945 |
| 2,503,130 | Poritz | Apr. 4, 1950 |
| 2,533,384 | Martinez | Dec. 12, 1950 |
| 2,588,286 | Perwolf | Mar. 4, 1952 |
| 2,625,750 | Merrill | Jan. 20, 1953 |
| 2,656,619 | Thurstone et al. | Oct. 27, 1953 |

FOREIGN PATENTS

| | | |
|---|---|---|
| 618,778 | Great Britain | Feb. 28, 1949 |